United States Patent [19]

Farr

[11] 4,114,145
[45] Sep. 12, 1978

[54] DUAL HYDRAULIC BRAKING SYSTEM FOR VEHICLES

[75] Inventor: Glyn Phillip Reginald Farr, Leek Wootton, England

[73] Assignee: Girling Limited, Birmingham, England

[21] Appl. No.: 695,467

[22] Filed: Jun. 14, 1976

[30] Foreign Application Priority Data

Jun. 12, 1975 [GB] United Kingdom ............... 25169/75
Oct. 7, 1975 [GB] United Kingdom ............... 41110/75

[51] Int. Cl.² ............................................. G08B 21/00
[52] U.S. Cl. ................................ 340/626; 200/82 D; 303/6 C; 340/52 C
[58] Field of Search ................. 340/244 E, 242, 52 C; 200/82 D; 303/84 R, 6 C

[56] References Cited

U.S. PATENT DOCUMENTS 2,857,584  10/1958  Gibson ........................... 340/242 X
3,825,706  7/1974  Papiau ............................ 200/83 D X

*Primary Examiner*—John W. Caldwell, Sr.
*Assistant Examiner*—Daniel Myer
*Attorney, Agent, or Firm*—Scrivener, Parker, Scrivener & Clarke

[57] ABSTRACT

In a pressure differential warning actuator for detecting when a differential between the pressure of separate brake circuits of an hydraulic braking system exceeds a predetermined value, at least two separate pistons work in separate bore portions in a common housing and are movable between a neutral position when the predetermined value of the differential pressure is not exceeded and an operative position, in which an indicator mechanism is actuated, when the predetermined value is exceeded, and the pistons act through a lever ratio change mechanism to restore them from the operative position to the neutral position when the differential is reduced to less than the predetermined value.

17 Claims, 12 Drawing Figures

DUAL HYDRAULIC BRAKING SYSTEM FOR VEHICLES

This invention relates to a new or improved pressure differential warning actuator of the kind for detecting when a differential between the pressure of separate brake circuits of an hydraulic braking system exceeds a predetermined value, the actuator comprising an assembly located within a housing and adapted to be exposed over different regions to pressures applied to the brake circuits, and indicator means adapted to be actuated by the assembly when the differential pressure to which the assembly is subjected exceeds the predetermined value, the indicator means automatically being rendered inoperative when the differential pressure is decreased to a value less than the said predetermined value.

In one known construction of pressure differential warning actuator of that kind the assembly comprises a pair of sleeves working in a bore in the housing and a piston working through aligned axial bores in the sleeves and, when the differential pressure is below the predetermined value, the sleeves are prevented from moving in directions towards each other by stop means and the assembly is held in neutral position, the sleeves and the pistons being keyed together against axial movement of the piston relative to the sleeves in directions away from the stop means to permit movement of one of the sleeves with the piston relative to the other sleeve when the pressure differential exceeds the predetermined value whereby the indicator means is actuated, and, upon the pressure differential being decreased to a value less than the predetermined value, the force applied to the assembly by the pressure acting on the end of the assembly comprising the piston and the said one sleeve is greater than the force applied to the opposite end, which is effective only over the area of the piston, the assembly is restored to the said central position and the indicator means is rendered operative.

According to our invention in a pressure differential warning actuator of the kind set forth the assembly comprises at least two separate pistons working in separate bore portions in a common housing and movable between a neutral position in which the indicator means is rendered inoperative when the differential pressure is less than the said predetermined value, and an operative position in which the indicator means is rendered operative when the differential pressure exceeds the said predetermined value, and a lever mechanism through which the pistons act to restore the pistons from the said operative position to the said neutral position automatically without any change in the effective area of the pistons taking place when the differential pressure decreases to a value less than the predetermined value, the lever mechanism acting between the pistons and movable between an inoperative positions when the pistons are disposed in the said neutral position and a ratio change position when the pistons are disposed in the said operative position, and the lever mechanism being so constructed and arranged that a force applied from one piston to another to restore the pistons to the said neutral position is greater than the force transmitted therebetween to move the pistons into the said operative position.

Since the lever mechanism alters the magnitude of the force transmitted between the pistons in opposite directions under different conditions and no area change takes place, the construction of the pressure differential actuator is considerably simplified in comparison with known constructions since the sleeves, and the stop means are omitted. Also only a single leak path is provided for each piston.

The lever mechanism may comprise a lever adapted to rock about a fulcrum in the housing and to act on each piston at points in its length spaced by different distances from the fulcrum to change the effective leverage of the lever in accordance with the direction of displacement of the lever away from its inoperative position.

In one construction the pistons work in spaced parallel bore portions in the housing and project at their outer ends from the bore for engagement with the lever, the inner ends of the pistons being exposed to the pressure in separate circuits of an hydraulic braking system. In such a construction more than two pistons, conveniently three, can be incorporation, each working in a separate bore and exposed at its inner end to the pressure in one circuit of a triple hydraulic braking system.

In another construction the bore portions in which the pistons work are spaced longitudinally and the lever, which is transverse to the bore, acts between the adjacent inner ends of the pistons and the outer ends of the pistons are exposed to pressure in the separate circuits of a dual hydraulic braking system. The inner ends of the pistons may engage with diametrically opposed points on the lever, the lever preferably rocking at one end about the fulcrum comprising a recess in the housing and at the other end operating a contact of a switch which actuates the indicating means. The switch may be enclosed within a body which is located in the housing by means of a push in and snap engagement.

Some embodiments of our invention will now be described by way of example with reference to the accompanying drawings, in which.

Figure 1:
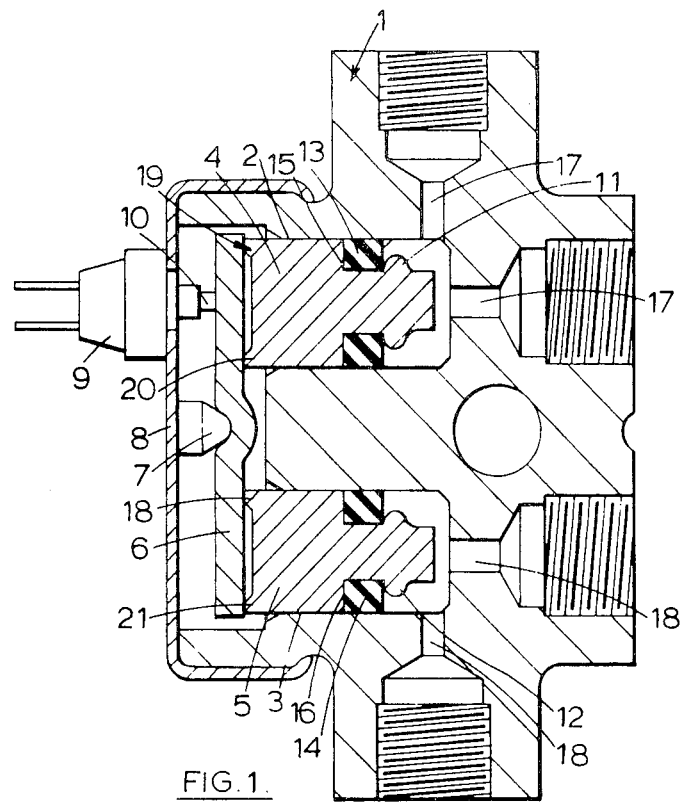
FIG. 1 is a longitudinal section through a pressure differential warning actuator with pistons working in spaced parallel bores.

The pressure differential warning actuator illustrated in FIG. 1 of the drawings comprises a housing 1 provided with a pair of spaced parallel blind bores 2, 3 in which work pistons 4, 5. Adjacent outer ends of the pistons 4, 5 project from the bores 2, 3 and engage with opposite ends of a transverse lever 6 which is adapted to rock at substantially the mid-point in its length about a fulcrum 7 in a closure member 8 secured to the housing. An electrical switch 9 for actuating a warning device, conveniently a light, is mounted on the member 8 and has an operating member 10 engaging with the lever 6.

The pistons 4, 5 are of stepped outline, the inner ends being of smaller diameter and the outer ends being of larger diameter. Annular ridges 11, 12 are provided at intermediate points in the lengths of the smaller diameter end portions of the pistons. Seals 13, 14 are positioned on the smaller diameter ends of the pistons between the ridges 11, 12 and shoulders 15, 16 at the steps in diameter between the smaller diameter portions and the larger diameter portions.

The inner ends of the pistons 4, 5 are exposed to pressures in separate circuits of dual hydraulic braking systems through passages 17, 18 in the housing 1. When the pressure in the circuits are equal or substantially equal the pistons 4, 5 are held in neutral positions, applying equal and opposite forces to each other through the lever which is held in an inoperative position in which the switch is "off."

The outer ends of the pistons 4, 5 which engage the lever 6 are both formed with a raised annulus or rim 19 each of which define an inner fulcrum 20 and an outer fulcrum 21. When the pistons 4, 5 are in the said neutral positions the rims 19 both engage with the lever 6 over their total areas. When the pressure in one of the circuits, for example that acting on the piston 5, falls, the pressure differential acting on a piston assembly comprising both pistons 4 and 5 exceeds a predetermined value and the pressure acting on the piston 4 urges the piston outwardly to rock the lever 6 angularly about the fulcrum 7 with the result that a force is transmitted to the piston 5 through the lever 6. A ratio change takes place with the force from the piston 4 acting through the length of the lever 6 between the inner fulcrum 20 and the fulcrum 7 being greater than a moment equal to the force acting on the piston 5 multiplied by the distance between the fulcrum 7 and the outer fulcrum on the piston 5, which distance is greater than the lever length between the inner fulcrum 20 on the piston 4 and the fulcrum 7. The pistons 4 and 5 thus move until the lever 6 operates the switch 9 to actuate the warning device.

When the pressure acting on the piston 4 is removed, the lever 6 remains in the same position due to the friction of the piston seals 13, 14.

In a modification (not shown) a caged leaf spring may be placed between the lever 6 and the switch 9 to ensure that the light remains on even through the seals 13, 14 may roll back and permit the pistons to move towards the neutral position.

When the defective brake circuit has been repaired and the brakes are re-applied equal pressures are applied to the pistons 4, 5 and the greater moment produced by the piston 5 acting on the lever 6 easily overcomes the moment acting in the opposite direction, namely the force from the piston 4 acting through a shorter lever distance. Thus the lever is restored to its original inoperative position, the switch 9 is restored to the "off" position, and the pistons 4, 5 are restored to their neutral position.

In a modification three or more equally spaced pistons, each subjected to pressure in a separate brake circuit, can act on the lever 6 and the forces can be transmitted between the pistons as described above.

Figure 2:
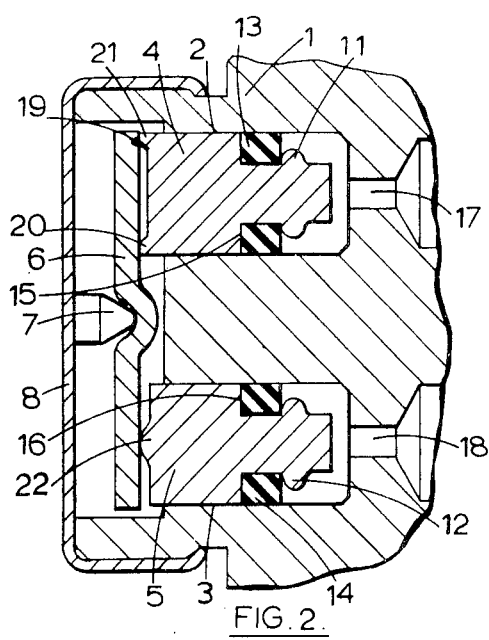
FIG. 2 is similar to FIG. 1 but showing a modification.

In the modification of FIG. 2 in which the switch, which is not shown is positioned as shown in FIG. 1, the rim on the piston 5 is replaced by a central dome 22 so that the lever 6 has an arm of an effective length less than the maximum effective length of the other arm when it engages with the fulcrum 21 but greater than its minimum effective length when it engages with the other fulcrum 20.

Figure 3:
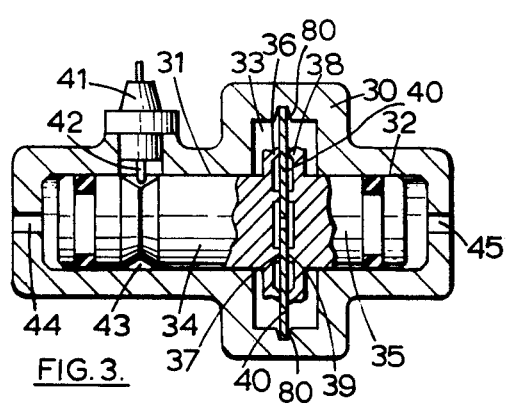
FIG. 3 is a longitudinal section of another pressure differential warning actuator which incorporates axially aligned pistons.

The pressure differential warning actuator illustrated in FIG. 3 of the drawings comprises a housing 30 provided with co-axial bore portions 31 and 32 which are interconnected by a chamber 33 of increased diameter disposed at a position substantially one-third of the length of the housing.

Opposed pistons 34 and 35 working in the bore portions 31 and 32 are provided at their inner ends with enlarged heads located within the chamber 33 and defining respectively inner and outer two fulcrum points 36 and 37, 38 and 39 for engagement with opposite faces of separate levers 40 each of which rocks at one end about a fulcrum 80 comprising a recess in the housing.

A switch 41 for operating the warning device is mounted in the wall of the housing 30 and has an operating member 42 which is received in a groove 43 in the wall of the longer piston 34 and which is of oppositely inclined form.

The pistons 34 and 35 are held in a neutral position with the fulcrums of both pairs engaging with opposite faces of the levers 40 when both pistons are subjected to equal pressures from separate brake circuits through ports 44 and 45 in opposite ends of the housing 30.

When the pressure in one of the circuits fails, for example that acting on the piston 35, the force on the piston 34 is transmitted thereto through the levers 40 which rock in the recesses 80 about the outer fulcrum points 35 on piston 34 and engage with the inner fulcrum points 39 on piston 35. The pistons 34 and 35 move axially and movement of the piston 34 operates the switch 41.

After the fault has been repaired when the brakes are re-applied the force from the piston 35 acting through a higher leverage easily overcomes the moment of the force in the opposite direction comprising the force on the piston 34 acting through a smaller leverage.

Figure 4:
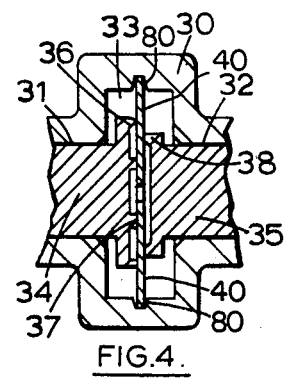
FIG. 4 is similar to FIG. 3 but showing a modified lever arrangement.

In the modified construction of FIG. 4 the piston 35 has only one pair of fulcrum points 38 situated at points on the levers 40 between the outer and inner fulcrum points 36 and 37 on the piston 34. The operation is the same as that of the FIG. 3 construction.

Figure 5:
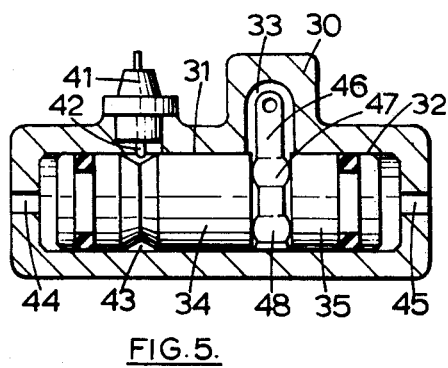
FIG. 5 is similar to FIG. 4 but showing different lever constructions.

In the embodiment of FIG. 5, a lever 46 pivotally connected at one end to the housing 30 is provided on opposite sides with spaced inner and outer fulcrum points 47 and 48 with which adjacent plain ends of the piston 34 and 35 engage.

The construction and operation of the embodiment of FIG. 5 is similar to that of FIGS. 3 and 4 and corresponding reference numerals have been applied to corresponding parts. When the pressure in the circuit acting on the piston 35 fails, the force on piston 34 acts on the lever 46 to rock it about its pivot so that the piston 34 acts at fulcrum point 47 and the piston 35 acts at fulcrum point 48. Thus each piston acts at a different lever ratio and when equal pressures are again applied to both pistons the lever ratio acts to restore the pistons to their neutral positions.

Figure 6:
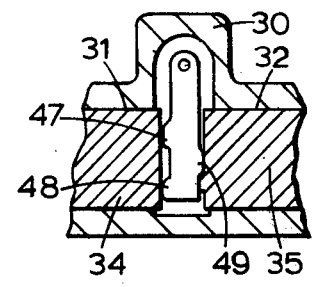
FIG. 6 shows a modification of the lever of FIG. 5.

In the modification of FIG. 6 the fulcrum points 47 and 48 for engagement with the piston 35 have been replaced by a single fulcrum point 49 intermediate the fulcrum points 47 and 48 on the opposite side of the lever. The operation of this construction is otherwise the same as that of FIG. 5.

Figure 7:
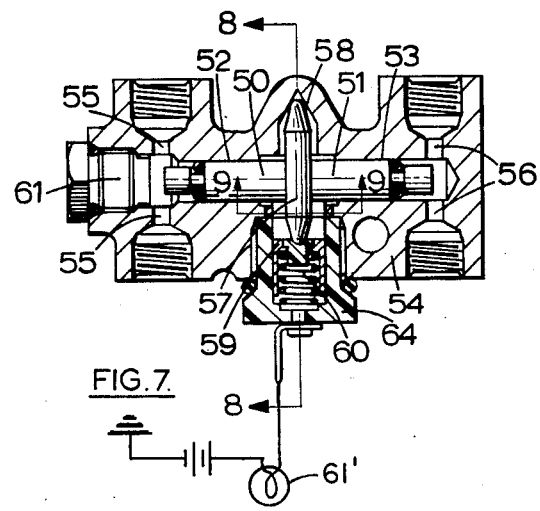
FIG. 7 is a longitudinal section through yet another pressure differential warning actuator.
Figure 8:
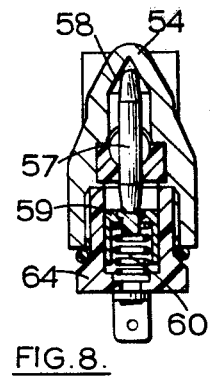
FIG. 8 is a section on the line 8—8 of FIG. 7.
Figure 9:
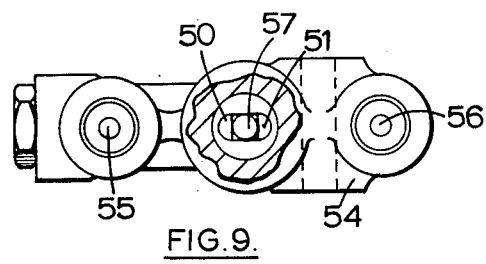
FIG. 9 is a plan of the actuator incorporating a section on the line 9 — 9 of FIG. 7.

In the actuator illustrated in FIGS. 7 to 9, opposed pistons 50 and 51 work in axially spaced co-axial bore portions 52 and 53 in a housing 54. The outer ends of the pistons 50 and 51 are exposed to the pressure in separate brake circuits of a dual braking system through ports 55 and 56 in the housing 54 and the adjacent inner ends of the pistons engage with diametrically opposed points on a transverse lever 57 of circular outline. The lever 57 rocks at one end about a fulcrum comprising a recess 58 in the housing and the opposite end of the lever 54 operates the contact 59 of a switch 60 for the warning device comprising indicating means 61". The end portions of the lever are conical in shape with rounded ends which engage with the recess 58 and the contact 59, respectively.

The diametrically opposite inner and outer edges of the pistons 50 and 51 define fulcrums for the lever 57. Thus both inner and outer edges of the pistons 50 and 51 engage with the lever 57 when both pistons are subjected to equal pressures. However, when one circuit fails, the piston supplied by the other circuit acts on the lever 57 engaging at its edge closest to the recess 58 with the lever, in turn, rocking in the recess to operate the switch 60 and engaging with the edge of the piston 51 which is remote from the recess 58. Thus each piston acts at a different lever ratio, with the highest ratio provided by the piston subjected to the failed circuit. When the ratio is corrected and equal pressures are again applied to both pistons, the higher ratio enabes the pistons to be restored to their neutral position and the switch rendered inoperative.

The bore portions 52 and 53 are provided by a longitudinally extending blind bore which is closed at its open end by a plug 61 comprising a screwed member as shown in FIG. 7.

Figure 10:
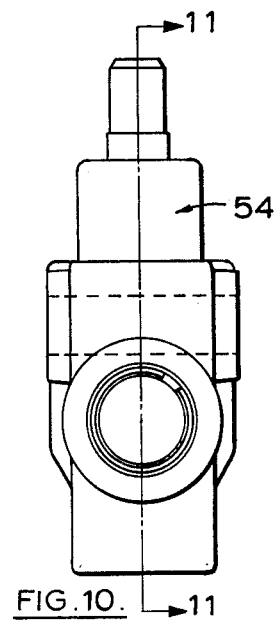
FIG. 10 is an end elevation on an enlarged scale of a pressure differential warning actuator similar to that shown in FIGS. 7, 8 and 9 but including a modification.
Figure 11:
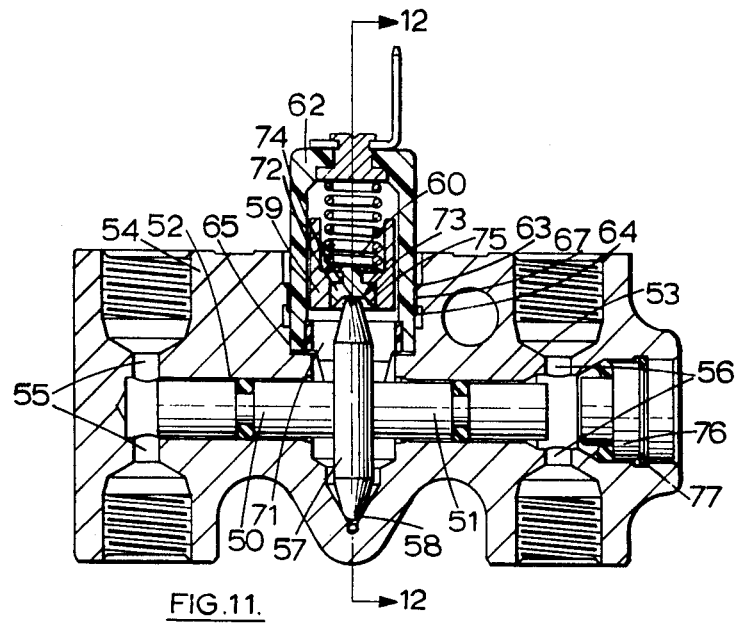
FIG. 11 is a longitudinal section on the line 11 — 11 of FIG. 10.
Figure 12:
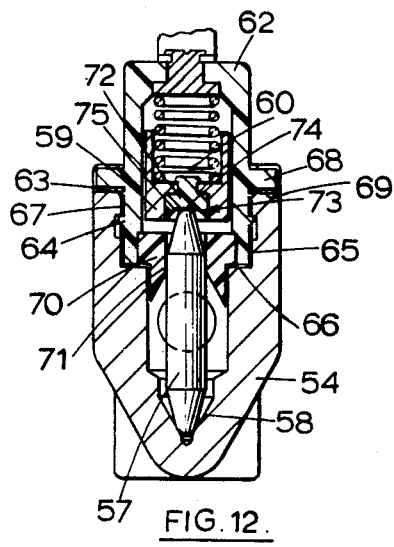
FIG. 12 is a transverse section on the line 12 — 12 of FIG. 11.

FIGS. 10 to 12 show the actuator illustrated in FIGS. 7 to 9 on an enlarged scale, but with a modification in the mounting of the switch and a different type of closure for the open end of the bore. The switch 60 is enclosed within a generally cylindrical body 62 of synthetic plastics material. The cylindrical body is provided with longitudinally spaced radial ribs 63 and 64 adjacent to its inner end. The body 62 is received in the housing 54 through a counterbored radial opening 65 with the inner end of the body 62 being located adjacent to a shoulder 66 at the step in diameter, and the ribs 63 being sealingly disposed against opposite faces of a complementary rib 67 in the opening 65 and over which the rib 64 is deformable when the body is inserted into the opening 65 in order to provide a push-in and snap engagement in the housing 54.

A pair of diametrically opposed radial lugs 68, see FIG. 12, are received in complementary recesses 69 in the housing at the outer end of the opening 65 to retain the body 62 against rotation when it is in its position of use. In this position a guide 70 for guiding the lever 57 projects towards the bores 52 and 53 and is arranged with the centre of a slot 71 lying in a plane containing the fulcrum 58 and the common axes of the bores 52 and 53 so that the lever 57 is restrained against movement in directions other than the said plane.

The contact 59 includes a centre 72 of insulated material provided with a recess 73 in which the end of the lever 57 remote from the fulcrum is received. The recess 73 has a substantially flat circular portion 74 of substantial area leading at its peripheral edge into an integral skirt 75 of conical outline.

As shown in FIG. 11, the longitudinally extending blind bore is closed at its open end by a sealing plug 76 which is held in position by means of a circlip 77.

In the embodiments described above the pistons may be of equal or different diameters compatible with the pressures in the brake circuits which may be different. The position of the fulcrum of the lever in the housing may be selected to provide the necessary leverage consistent with the pressure in the brake circuits and the areas of the pistons.

The construction of FIGS. 10 – 12 is otherwise the same as that of FIGS. 7 – 9 and corresponding reference numerals have been applied to corresponding parts.

I claim:

1. A pressure differential warning actuator comprising detector means for detecting when a differential between the pressures of separate brake circuits of an hydraulic braking system exceeds a predetermined value, a housing having separate bore portions and a relatively fixed pivot point therein, said detector means being positioned in said housing, said housing being also provided with ports connected to said separate brake circuits, and indicator means actuated by said detector means when said predetermined value is exceeded, said detector means comprising at least a first piston and a second piston each responsive to pressure in at least one of said brake circuits, said pistons working in respective separate bore portions of said housing, pressure from said separate brake circuits being connected through said ports to said pistons to move said pistons between a neutral position in which said indicator means is rendered inoperative when said differential pressure is less than said predetermined value, and an operative position in which said indicator means is rendered operative when said differential pressure exceeds said predetermined value, and a lever means through which said pistons act and which is adapted to restore said pistons from said operative position to said neutral position only when said differential pressure decreases to a value less than said predetermined value, said lever means comprising a lever adapted to rock about said fixed pivot point, and at least one fulcrum acting between each piston and said lever at least in said operative position and being positioned such that when said pistons are in said operative position said fulcrum on one of said pistons is spaced farther from said fixed pivot point than said fulcrum on another of said pistons.

2. A pressure differential warning actuator as claimed in claim 1 wherein said lever means comprises a lever and a fulcrum in said housing, said lever being adapted to rock about said fulcrum and said pistons engaging said lever at different points in the length of said lever.

3. A pressure differential warning actuator as claimed in claim 1, wherein said housing separte bore portions comprises spaced parallel bores in which said pistons are situated, said pistons projecting at their outer ends from said bores, said outer ends engaging with said lever, and inner ends of said pistons being exposed to pressure in said separate circuits of an hydraulic braking system.

4. A pressure differential warning actuator as claimed in claim 3, wherein a separate piston and a separate bore are connected to each separate circuit of a multiple hydraulic braking system, the number of pistons provided being equal to the number of circuits in said braking system.

5. A pressure differential warning actuator as claimed in claim 3, wherein a raised annulus is formed at said outer end of each of said pistons.

6. A pressure differential warning actuator as claimed in claim 3, wherein a raised annulus is provided at said outer end of said first piston and a central dome is provided at said outer end of said second piston.

7. A pressure differential warning actuator comprising detector means for detecting when a differential between the pressures of separate brake circuits of an hydraulic braking system exceeds a predetermined value, a housing provided with a bore, said detector means positioned in said bore, said housing also provided with ports connected to said separate brake circuits, and indicator means actuated by said detector means when said predetermined value is exceeded, said detector means comprising at least a first and a second piston, said pistons working in separate bore portions of said bore, pressure from said separate brake circuits being connected through said ports to said pistons, means for moving said pistons between a neutral position in which said indicator means is rendered inoperative when said differential pressure is less than said predetermined value, and an operative position in which said indicator means is rendered operative when said differential pressure exceeds said predetermined value, a lever means through which said pistons act and which is adapted to restore said pistons from said operative position to said neutral position when said differential pressure decreases to a value less than said predetermined value, a pivot point for such lever means and at least one fulcrum acting between each piston and said lever means at least in said operative position and being positioned such that when said pistons are in said operative position said fulcrum on one of said pistons is spaced farther from said pivot point than said fulcrum on another of said pistons wherein said housing is provided with longitudinally spaced co-axial bore portions in which said pistons work and said lever means acts between adjacent ends of said pistons, outer ends of said pistons being exposed to pressure in said separate circuits of a dual hydraulic braking system, and wherein said lever means comprises a lever which is transverse to said bore, and a fulcrum in said housing comprises said pivot point with which said lever engages for rocking motion, said lever engaging said pistons at points in its length spaced by different distances from said fulcrum.

8. A pressure differential warning actuator as claimed in claim 7, wherein said housing is provided with a chamber of greater diameter than said bore, said chamber being positioned between said bore portions, and said lever means being located in said chamber.

9. A pressure differential warning actuator as claimed in claim 8, wherein said lever means comprises two separate levers anchored to opposite points in said housing, and said pistons have enlarged heads located within said chamber, inner and outer fulcrum points being provided on said heads for engagement with opposite faces of said levers.

10. A pressure differential warning actuator as claimed in claim 7, wherein said lever means comprises a lever pivotally connected to said housing, spaced fulcrum points being provided on opposite sides of said lever for engagement with adjacent plain ends of said pistons.

11. A pressure differential warning actuator as claimed in claim 7, wherein an electrical switch is mounted in the wall of said housing, said switch having an operating member, a groove being provided in the wall of said first piston, said operating member being received in said groove such that said switch is operated if said first piston moves in either direction from said neutral position.

12. A pressure differential warning actuator as claimed in claim 7, wherein said fulcrum comprises a recess in said housing, an electrical switch being positioned in said housing opposite said electrical fulcrum, said switch having a contact which is engaged and operated by an end of said lever remote from said fulcrum to actuate said indicating means.

13. A pressure differential warning actuator as claimed in claim 12, wherein a body for said switch is retained in said housing, said switch being enclosed within said body.

14. A pressure differential warning actuator as claimed in claim 13, wherein said body has an inner end provided with an outwardly directed resilient radial rib, said housing being provided with an opening into which said inner end of said body is inserted, a complementary rib being provided on the wall of said opening over which said radial rib on said body is deformable to retain said body in said housing when said inner end is inserted into said opening.

15. A pressure differential warning actuator as claimed in claim 13 wherein, said body is provided with at least one lug, said housing being provided with a complementary recess in which said lug is received to locate said body in said housing against rotation relative thereto.

16. A pressure differential warning actuator as claimed in claim 13, wherein said body incorporates a guide through which said lever projects to traverse said bore, said guide comprising means permitting movement of said lever about said fulcrum only in a plane through said fulcrum and containing the axis of said bore.

17. A pressure differential warning actuator as claimed in claim 12, wherein said contact includes a centre of insulated material provided with a recess in which said end of said lever is received, said recess comprising a substantially flat circular portion leading at its peripheral edge into an integral skirt of conical outline.

* * * * *